United States Patent Office 3,453,237
Patented July 1, 1969

3,453,237
LIGHT-SENSITIVE POLYMERS HAVING A LINEAR CHAIN CONTAINING THE STYRYL KETONE GROUP
Douglas G. Borden, Cornelius C. Unruh, and Stewart H. Merrill, Rochester, N.Y., assignors to Eastman Kodak Company, Rochester, N.Y., a corporation of New Jersey
No Drawing. Filed July 21, 1959, Ser. No. 828,455
Int. Cl. C08g *17/13*
U.S. Cl. 260—47                    8 Claims

ABSTRACT OF THE DISCLOSURE

Photosensitive polyesters, including polycarbonates, containing the styryl ketone group are disclosed and a method of preparing them is described by reaction of at least one bisphenol with at least one reactive acid dichloride.

---

This invention relates to light-sensitive polymers containing recurring styryl ketone groups of the structural formula

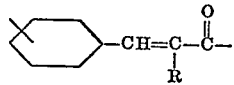

as an integral part of the polymer backbone; R being hydrogen or a hydrocarbon group.

Although a number of polymers containing light-sensitive styryl ketone groups have been described in the past, the light-sensitive groups have invariably occurred as side chains attached to a polymer backbone. For example, styryl ketone groups have previously been appended to the hydrocarbon backbone of a vinyl polymer.

A primary object of the present invention is to introduce the light-sensitive styryl ketone group into the backbone of certain polymers in order to provide compositions of greater inherent sensitivity to light.

The above and other objects of the invention are attained by the preparation of the novel polymers described hereinafter which have been divided into four groups for purposes of discussion.

In general, the new polymers of Groups I, II and III are derived from the interaction of light-sensitive bisphenols and certain reactive chloride compounds whereas the polymers of Group IV are derived from a ketone-aldehyde type condensation in which the desired light-sensitive groups are formed. More specifically, the polymers of Group I are polycarbonates obtained by the reaction of a light-sensitive bisphenol, containing a styryl ketone group in its structure, with phosgene as the reactive chloride compound. Mixtures of one or more bisphenols containing styryl ketone groups or mixtures of at least one bisphenol containing a styryl ketone group and one or more non-light-sensitive bisphenols may also be employed. The polymers of Group II are polyesters obtained by the reaction of a bisphenol containing a styryl ketone group with a reactive chloride compound such as a di-acid chloride of an aliphatic, alicyclic or aromatic dicarboxylic acid, or the chlorides of certain sulfur- or phosphorus-containing acids. As above, mixtures of light-sensitive and non-light-sensitive bisphenols may be employed and if desired, mixtures of the acid chlorides may also be used. The polymers of Group III like those of Group I are polycarbonates and are obtained by reacting a bisphenol reactant of the type described above with a bischloroformate as the reactive chloride compound. The polymers of Group IV are formed by the condensation of an aromatic dialdehyde or bisaldehyde with a ketone having two reactive methyl or methylene groups, each adjacent to a carbonyl group. Representative light-sensitive polymers of the present invention from each of these four groups and typical methods of preparing these polymers are illustrated by the following formulae and equations:

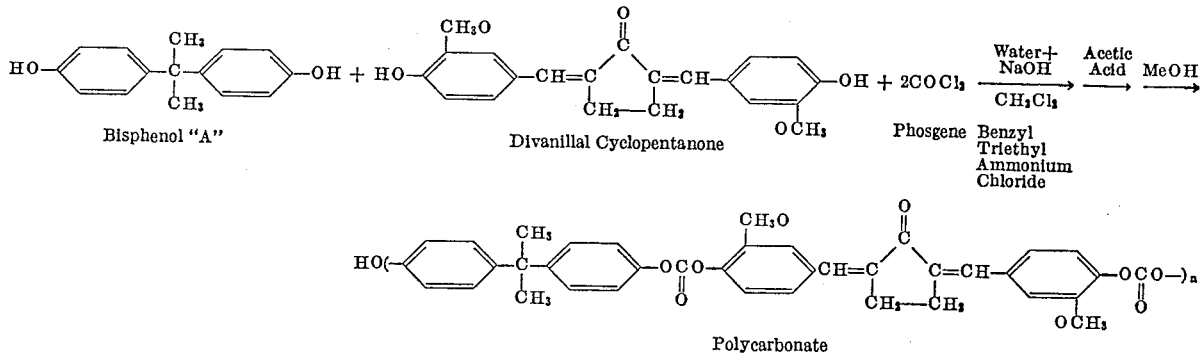

GROUP II
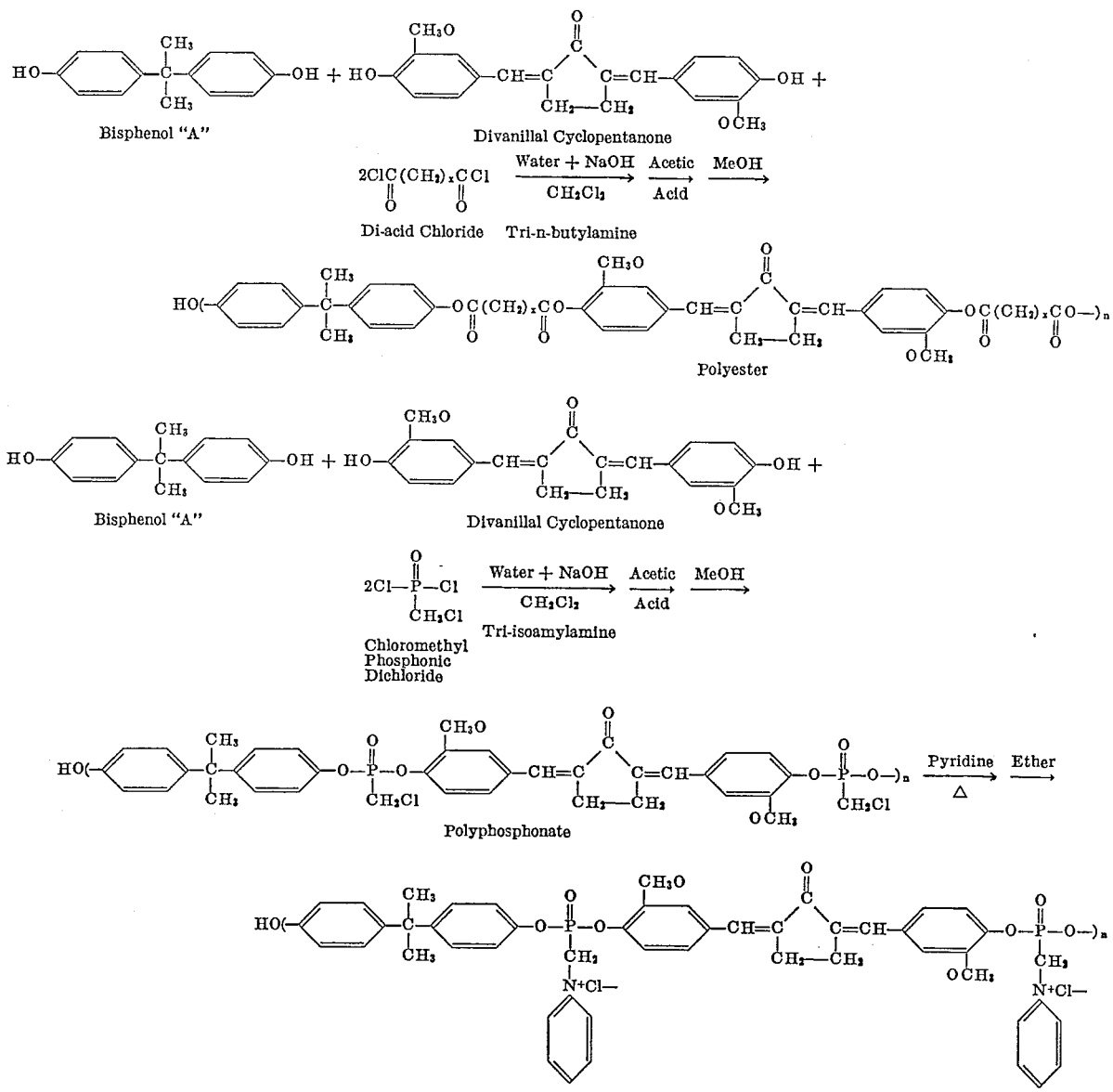
GROUP III
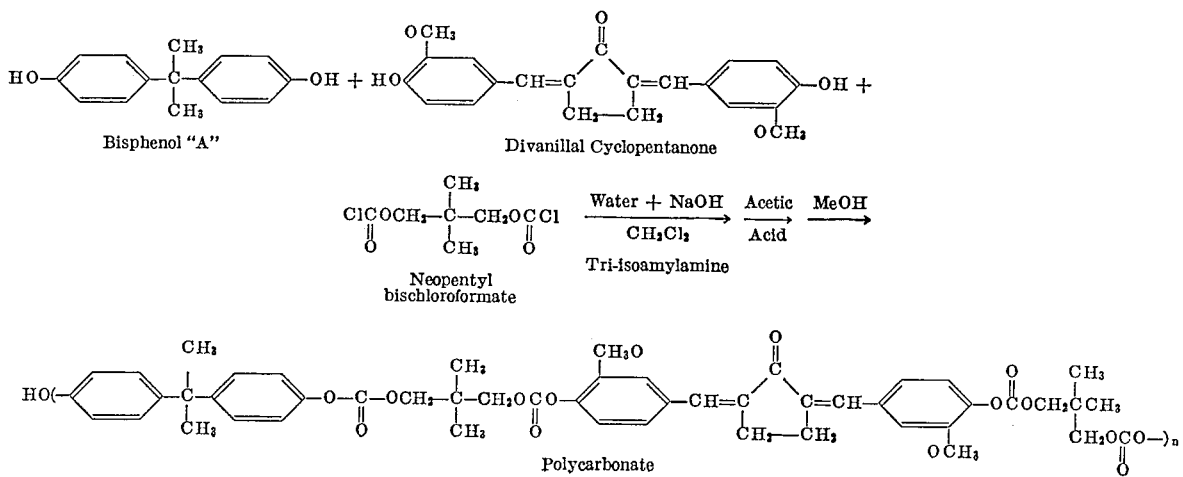

GROUP IV

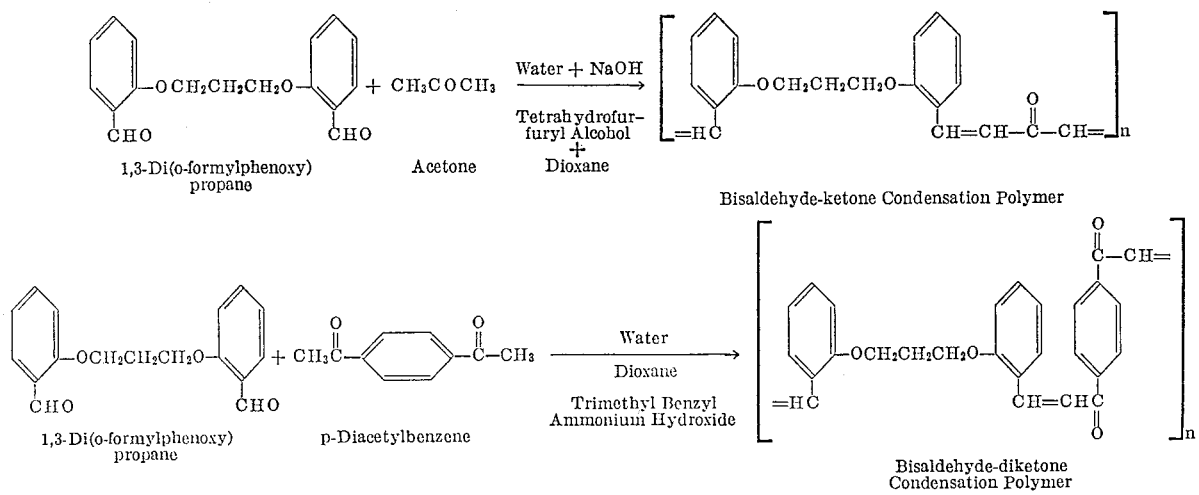

In the formulae above $x$ is a whole number from 1 to about 8 and $n$ is a number sufficiently large to ensure a film-forming or resinous polymer and in most cases is at least 5; polymers in which $n$ is greater than 5 i.e. 10–30 or higher are preferred.

In general, the new polymers of Groups I, II and III are prepared by allowing a bisphenol to react with the appropriate reactive chloride in the presence of a suitable catalyst in a two-phase solvent system. The term "reactive chloride" as employed herein is intended to include phosgene, di-acid chlorides of aliphatic or aromatic dicarboxylic acids, certain sulfur and phosphorous acid chlorides, and bischloroformates, all of which are described in greater detail below. The bisphenol reactant and the catalyst, preferably a basic catalyst such as an amine, are normally dissolved in aqueous sodium hydroxide. The reactive chloride is customarily dissolved in a water-immiscible inert organic solvent such as dichloromethane. The two-phase reaction mixture is then stirred while the desired polymer is formed at the interface. Although the polymer solution usually attains a good viscosity after a few minutes it has been found that the light-sensitivity of the resulting polymer can be increased by prolonging the reaction time beyond this point. The condensation reaction is stopped when sufficiently complete by the addition of excess acetic acid. The desired polymer, present in the dichloromethane layer, is washed with water to remove salts and is then separated by precipitation with methanol.

Reaction times of about 50 to 100 minutes are generally sufficient at temperatures of about 3 to 25° C. although longer or shorter times and somewhat lower or higher temperatures may be employed with success in some instances. The optimum reaction conditions for the formation of the polymers of Groups I, II and III vary with the specific reactants and catalysts employed as well as other factors. It has been found, however, that excellent high-viscosity polymers are generally obtained at reaction temperatures in the range from about 3 to 10° C.

It is preferred to employ from about 10 to 30 mole percent excess of the reactive chloride with respect to the bisphenol reactant since in many cases the use of stoichiometric quantities of the reagents results in incomplete reaction and low molecular weight polymers. This is probably due to the hydrolysis of the reactive chloride compounds in the aqueous phase of the reaction mixture. Such hydrolysis occurs to a greater extent with the diacid chlorides of dicarboxylic acids than with phosgene or the bischloroformates and is most pronounced with such reactive chlorides as the phosphonic dichlorides and thionyl chloride which may require the use of up to 100 mole percent excess reagent for best results.

Inasmuch as the polymers of Groups I, II and III are formed at the interface of a two-phase system, it is advantageous to employ a catalyst which is also an effective surfactant. Quaternary salts such as benzyl triethyl ammonium chloride are suitable catalysts although less effective than the tri-alkylamines. Triethylamine, tri-n-butylamine and tri-isoamylamine are especially useful.

As noted above, the polymers of Group IV are formed by the condensation of dialdehydes or bisaldehydes, in which the aldehyde groups are separated by an aromatic nucleus, with a ketone or diketone containing at least two reactive methyl or methylene groups, each adjacent to a corbonyl group. The light-sensitive -styryl ketone group characteristic of the polymers of this invention is formed directly in the backbone of the polymers of Group IV whereas it is present in at least a portion of the original bisphenol reactant used in the preparation of the polymers of Groups I, II and III. The dialdehyde-ketone condensation is carried out in an inert organic solvent or solvent mixture at ambient or slightly elevated temperatures in the presence of an alkaline catalyst which may be sodium hydroxide or one of the catalysts noted above as useful in the preparation of the polymers of Groups I, II and III. Also, as with the preparation of the previously described polymers, the reaction may be stopped, when sufficiently complete, by the addition of excess acetic acid to the reaction mixture. The polymer can then be precipitated by pouring the reaction mixture into a large volume of methanol or water and the product purified by solution in dioxane and reprecipitation in methanol or water.

The reactive chlorides useful in the preparation of the polymers of the present invention include:

(1) di-acid chlorides of aliphatic, alicyclic and aromatic dicarboxylic acids. The preferred aliphatic and alicyclic di-acids are those in which the alicyclic or aliphatic chain is a lower alkyl group containing from 1 to about 8 carbon atoms. The preferred aromatic di-acids are those of the benzene series. Specific di-acid chlorides useful in the invention include adipyl chloride, fumaryl chloride, glutaryl chloride, oxalyl chloride, succinyl chloride, azelayl chloride, phthaloyl chloride, cis and trans 1,4-cyclohexane dicarboxyl chloride;

(2) acid chlorides of phosphorus-containing acids such as chloromethyl phosphonic dichloride and dichlorophenyl phosphine oxide; and (3) acid chlorides of sulfur-containing acids such as thionyl chloride (4) Bischloroformates useful in the invention include those derived from aliphatic glycols, particularly those having from 1 to about 8 and preferably from 1 to 5 carbon atoms, among others. Specific bischloroformates which may be employed include: ethylene bischloroformate, diethylene glycol bischloroformate, neopentyl bischloroformate, 1,3-propanediol bischloroformate, 2-methyl-2-nitro-1,3-propanediol bischloroformate, and 5 - (4-azidobenzal)-3-(p-hydroxyethylphenyl)-2-(p-hydroxyethylphenylimino) thiazolidine bischloroformate.

Light-sensitive bisphenol reactants, containing the styryl ketone group, useful in the invention include dihydroxy chalcones and dihydroxy dibenzal ketones such as:

4,4'-dihydroxy chalcone
2,6-bis(3-hydroxybenzal) cyclohexanone
2,6-bis(4-hydroxybenzal) cyclohexanone
divanillal acetone
divanillal cyclohexanone
divanillal 4-methylcyclohexanone
divanillal cyclopentanone
disyringal cyclopentanone
disyringal acetone
1,5-bis(4-hydroxy-3-methoxyphenyl)2-methyl-1,4-pentadiene-3-one As noted above, the bisphenol reactants may be employed singly or in mixtures in the preparation of the polymers of Groups I, II and III. It has been found further that the incorporation of from about 5–95% by weight of certain non-light sensitive bisphenols in the bisphenol reactant mixture improves the solubility and molecular weight of the light-sensitive polymers derived therefrom. The ratio of light-sensitive bisphenol to non-light-sensitive bisphenol can be varied at will within the range from about 5–95 mole percent light-sensitive to 95–5 mole percent non-light-sensitive bisphenol depending upon the effect desired. With the polymers of Group I it has been found that the use of from about 40–60 mole percent of non-light-sensitive bisphenol produces the most useful polymers. With the Group II polyesters and the Group III polycarbonates, on the other hand, the most desirable compositions are obtained by the used of from about 10–30 mole percent of non-light-sensitive bisphenol. Suitable non-light-sensitive bisphenols include:

2,2-bis(4-hydroxyphenyl)propane [bisphenol A]
2,2-bis(4-hydroxy-3,5-dibromophenyl)propane [tetrachloro bisphenol A]
2,2-bis(4-hydroxy-3,5-dibromophenyl)propane [tetrabromo bisphenol A]
4,4'-dihydroxydiphenyl sulfone
vanillalazine
salicalazine
4-(m-nitrophenylazo) resorcinol
quinizarin
dibenzoyl resorcinol
2-(4-hydroxyphenylimino)-3-(4-hydroxyphenyl)-5-(4-azidobenzal) thiazolidine Aldehydes useful for the preparation of the polymers of Group IV include dialdehydes and bisaldehydes in which the two aldehyde groups are separated by an aromatic nucleus, preferably, but not limited to, nuclei of the benzene series. The aromatic nucleus may be substituted or unsubstituted so long as it is free from photographically active groups or functional groups which would interfere with the course of the aldehyde-ketone condensation reaction. Specific aldehydes which have been found useful in the invention include 1,3-di(o-formylphenoxy)propane, 1,3-bis(2-methoxy - 6-formylphenoxy) propane and terephthaldehyde among others.

The ketones and diketones employed in the preparation of the polymers of Group IV may be either aliphatic, alicyclic or aromatic in nature so long as they contain two and only two reactive methyl or methylene groups each adjacent to a carbonyl group. Specific ketones of this description include acetone, cyclohexanone and p-diacetylbenzene. Mixtures of these ketones, e.g. a mixture of acetone and diacetylbenzene, may also be employed with advantage.

The preparation, properties and utility of representative polymers will be described in detail in the following specific examples which are illustrative only and are not to be construed as limiting the scope of the invention.

GROUP I POLYMERS

Example 1

Eighteen and six-tenths grams (0.05 mole) of divanillal cyclohexanone and one gram of benzyltriethylammonium chloride were dissolved in a boiling solution of 6.1 grams (0.15 mole) of NaOH in 200 ml. distilled water. This solution was cooled to 20° C. in a 1-liter, 3-necked flask, chilled under running cold water and fitted with a stainless steel paddle stirrer, thermometer, dropping funnel, and nitrogen inlet tube. One hundred milliliters of dichloromethane was added and then with vigorous stirring a solution of 6.0 grams (0.06 mole) phosgene in 50 ml. of dichloromethane was added dropwise over 15 minutes. Three minutes after addition of the last phosgene, a yellow polymer began to separate. More sodium hydroxide solution was added to keep the pH about 12. Fifty minutes after completing addition of the phosgene, the reaction was acidified with acetic acid. The polymer precipitated upon acidification. It was slurried twice in distilled water, filtered and dried. The bright yellow polymer was soluble upon heating in tetrachloroethane, hexamethyl phosphoramide, dimethyl sulfoxide, and cyclohexanone. It had an inherent viscosity of 0.31 in tetrachloroethane.

Example 2

A solution of 30 grams (0.30 mole) of phosgene in 200 ml. of dichloromethane was added dropwise with stirring at 20–23° C. to a mixture of 25 grams (0.11 mole) of bisphenol A, 50 grams (0.142 mole) of divanillal cyclopentanone, and 10 grams of benzyl triethyl ammonium chloride in 1500 ml. of 6.7% sodium hydroxide solution. The reaction was carried out in a five-liter, three-necked flask fitted with a stainless steel paddle stirrer. The flask was also equipped with a thermometer, a dropping funnel, and a reflux condenser vented through a calcium chloride tube to the hood. The flask was cooled in running water. A volume of dichloromethane equal to the aqueous solution was used. During the reaction, the polymer forming at the water-dichloromethane interface dissolved in the dichloromethane while the salts remained in the aqueous phase. The time of addition of the phosgene solution was 21 minutes and no pronounced increase in viscosity was noted nor did the wine-red color characteristic of the disodium salt of divanillal cyclopentanone completely disappear. There was no premature separation of polymer and the pH remained greater than 11 throughout the reaction. The object of this particular experiment was to determine the effect of reaction time on viscosity, light-sensitivity, and monomer proportions in the polymer. The reaction product at various times was obtained by withdrawing and acidifying a portion of the reaction mixture. In each case, a fluffy orange polymer precipitated which was washed several times in water and then in methanol. The polymer was then vacuum dried at 50° C. overnight. All polymer samples showed the same solubility. They were soluble upon heating to the boiling point in chloroform, tetrachloroethane, pyridine, cyclohexanone, hexamethyl phosphoramide, or in 1-chloronaphthalene. The polymer fractions were insoluble in dichloromethane, trichloroethylene, and in dioxane. For sensitometric tests, the polymer samples were coated from hot tetrachloroethane.

TABLE

| Cut | Reaction time (min.) | Inherent viscosity in tetrachloroethane | Glass factor | Plexiglas factor | Cl[1], found | H, found |
|---|---|---|---|---|---|---|
| A | 46 | 0.51 | 1,400 | 28 | 69.7 | 5.3 |
| B | 54 | 0.56 | 2,200 | 55 | 71.0 | 5.3 |
| C | 60 | 0.53 | 1,400 | 40 | 71.5 | 5.4 |
| D | 66 | 0.54 | 3,200 | 80 | 71.5 | 4.8 |
| E | 72 | 0.58 | 3,500 | 110 | 71.6 | 4.9 |

[1] Anal. Calc. for $C_{19.36}H_{16.34}O_{4.68}$: C, 71.8; H, 5.1.
Unit weight—323.8.

Example 3

A polycarbonate was prepared from 15.3 grams (0.05 mole) of 2,6-bis(3-hydroxybenzal) cyclohexanone and 6.0 grams phosgene. Addition time, 18 minutes. Reaction time, 39 minutes. A yield of 14.8 grams (89 percent) of bright yellow polymer was obtained. The product had the following properties. $\{\eta\}=0.15$. Glass factor, 35. Plexiglas factor, 1.3.

Example 4

Copolycarbonate: 7.7 grams (0.025 mole) 2,6-bis(4-hydroxybenzal) cyclohexanone, 5.9 grams (0.025 mole) bisphenol A, and 6.0 grams phosgene. Time to add, 16 minutes. Reaction time, 75 minutes. Fifteen and five-tenths grams (100 percent) of yellow fibers was obtained; $\{\eta\}=0.81$. This polymer remained in solution in the dichloromethane layer and was precipitated in methanol. It had much improved solubility in chlorinated solvents due to the use of the non-light-sensitive biphenol. Coated from tetrachloroethane. Glass factor, 50. Plexiglas factor, 1.1.

Example 5

A copolycarbonate was prepared from 10.6 grams (0.03 mole) of divanillal cyclopentanone, 6.8 grams (0.03 mole) of bisphenol A, and 7.0 grams of phosgene. Time of addition was 17 minutes and reaction time was 45 minutes. Fifteen grams (79 percent) of dark yellow fibers having an inherent viscosity of 0.59, a glass factor of 1100, and a Plexiglas factor of 25 was obtained.

*Analysis.*—Calc. for $C_{19}H_{16}O_{4.5}$: C, 72.1; H, 5.1. Found: C, 71.9; H, 5.7.

Example 6

A copolycarbonate was prepared from 12.7 grams (0.036 mole) of divanillal cyclopentanone, 5.5 grams (0.024 mole) of bisphenol A, and 7.0 grams of phosgene. The addition time was 15 minutes and the reaction time was 40 minutes. Eighteen and four-tenths grams (94 percent) of fluffy orange-yellow granules with an inherent viscosity of 0.43, a glass factor of 1800, and a Plexiglas factor of 32 was obtained.

*Analysis.*—Calc. for $C_{19.6}H_{16.4}O_{4.8}$: C. 71.5; H, 5.0. Found: C, 71.2; H, 5.3.

Example 7

A copolycarbonate was prepared from 0.76 gram (0.0025 mole) of 2,6-bis(4-hydroxybenzal) cyclohexanone and 10.83 grams (0.0475 mole) of bisphenol A, and 6.5 grams of phosgene. The time of addition was 15 minutes and reaction time was 70 minutes. Twelve grams (94 percent) of light yellow fibers, soluble in cyclohexanone, chloroform, and dichloromethane was obtained. With only 5 mole percent of the light-sensitive biphenol present, this polymer gave a good print-out image when coated from tetrachloroethane on oxidized aluminum.

Example 8

A copolycarbonate was prepared from 11.1 grams (0.03 mole) of divanillal 4-methylcyclohexanone, 6.8 grams (0.03 mole) of bisphenol A, and 8.0 grams of phosgene. The addition time was 12 minutes and reaction time 70 minutes. Fifteen and eight-tenths grams (80 percent) of long yellow fibers having an inherent viscosity of 0.90 in chloroform and a glass factor of 65 and Plexiglas factor of 1.8 when coated from cyclohexanone resulted. This polymer had very good solubility in dichloromethane, tetrachloroethane, chloroform and pyridine.

GROUP II POLYMERS

Example 9

A copolyester was prepared from 8.8 grams (0.025 mole) of divanillal cyclopentanone, 5.7 grams (0.025 mole) of bisphenol A, and 9.3 grams (0.060 mole) of succinyl chloride run in an analogous fashion to the copolycarbonates described above. That is, a two-phase reaction system with dichloromethane and aqueous caustic solution catalyzed by benzyltriethylammonium chloride. The addition time was 15 minutes and the reaction time 85 minutes. The product was 10.3 grams (56 percent) of a yellow powder having an inherent viscosity of 0.19 in chloroform and producing a good image when coated from tetrachloroethane, exposed to light for two minutes, and developed in tetrachloroethane for two minutes.

Example 10

A copolyester of 10.6 grams (0.03 mole) of divanillal cyclopentanone, 6.8 grams (0.03 mole) of bisphenol A, and 11.0 grams (0.072 mole) of fumaryl chloride was made in analogous fashion to that described above. The addition time was 10 minutes and the reaction time was 60 minutes. Ten and six-tenths grams (56 percent) of a bright yellow powder resulted which had an inherent viscosity of 0.41 in tetrachloroethane and gave a good image after two minutes' exposure when coated from and developed with tetrachloroethane.

*Analysis.*—Calc. for $C_{22}H_{18}O_{5.5}$: C, 71.3; H, 4.9. Found: C, 71.4; H, 5.3.

Example 11

A copolyester of 53.0 grams (0.15 mole) of divanillal cyclopentanone, 34.0 grams (0.15 mole) of bisphenol A, and 67.5 grams (0.40 mole) of glutaryl chloride was prepared using 20 minutes to add the acid chlorine and 120 minutes reaction time. One hundred grams (87 percent) of fine yellow fibers resulted having an inherent viscosity of 0.44 in chloroform and a glass factor of 1800, a Plexiglas factor of 28 when coated from cyclohexanone. This polyester was more soluble in various polar organic solvents than the corresponding polycarbonates.

*Analysis.*—Calc. for $C_{23}H_{22}O_{5.5}$: C, 71.5; H, 5.7. Found: C, 71.0; H, 5.9.

Example 12

A copolyester of 10.6 grams (0.03 mole) of divanillal cyclopentanone, 6.8 grams (0.03 mole) of bisphenol A, and 16.0 grams (0.071 mole) of azelayl chloride was prepared using 8 minutes addition time and 130 minutes reaction time. Fourteen and two tenths grams (53 percent) of yellow fibers resulted having an inherent viscosity of 0.20 in chloroform and possessing excellent solubility in polar solvents, including trichloroethylene. When coated on aluminum from tetrachloroethane, a good image was obtained with two minutes' exposure to an arc lamp.

Example 13

A copolyester of 20 grams (0.056 mole) of divanillal cyclopentanone, 10 grams (0.044 mole) of bisphenol A, and 24.4 grams (0.120 mole) of phthaloyl chloride was made using ten minutes for addition and 150 minutes for the reaction which was catalyzed by 1.0 gram of triethylamine. Thirty-five and eight-tenths grams (84 percent) of bright yellow granules resulted which gave a good image when coated on oxidized aluminum from tetrachloroethane, exposed to an arc lamp for two minutes, and developed in tetrachloroethane.

Example 14

A copolyester of 20 grams (0.056 mole) of divanillal cyclopentanone, 10 grams (0.044 mole) of bisphenol A, and 25.1 grams (0.120 mole) of trans-1,4-cyclohexane-dicarboxylic acid chloride was made using 5 minutes addition time and 55 minutes reaction time with the reaction catalyzed by triethylamine. Twenty-six and three-tenths grams (61 percent) of yellow-green granules provided a good ink-receptive image when coated from tetrachloroethane on oxidized aluminum, exposed for 2 minutes to an arc lamp, and developed in tetrachloroethane.

Example 15

A solution of 10.6 grams (0.03 mole) of divanillal cyclopentanone and 6.8 grams (0.03 mole) of bisphenol A in 300 ml. of water containing 10 grams of sodium hydroxide and 1 gram of benzyltriethylammonium chloride was reacted in a two-phase system with 13.4 grams (0.08 mole) of chloromethylphosphonic dichloride in 300 ml. of methylene chloride. After 80 minutes, the reaction was stopped by the addition of acetic acid, and the polymer was precipitated in methanol. After reprecipitation from chloroform in ether, 12.9 grams (56 percent) of a fluffy yellow polymer with a glass factor of 200 when coated from chloroform was obtained.

*Analysis.*—Calc. for $C_{19}H_{18}O_{4.5}PCl$: P, 8.1; Cl, 9.2. Found: P, 8.2; Cl, 8.5.

Example 16

In the same manner as Example 15, 17.6 grams (0.05 mole) of divanillal cyclopentanone and 11.4 grams (0.05 mole) of bisphenol A where reacted with 25.4 grams (0.13 mole) of dichlorophenylphosphine oxide to give 21.2 grams (60 percent) of a brownish-yellow polymer with an inherent viscosity of 0.11 in chloroform and a glass factor of 16 when coated from cyclohexanone.

GROUP III POLYMERS

Example 17

By a procedure similar to that described above, 35.2 grams (0.10 mole) of divanillal cyclopentanone was reacted with 30 grams (0.13 mole) of neopentyl bischloroformate. The reaction was conducted at 3–10° C., the addition time being 17 minutes, the color change from wine-red to orange occurring at 30 minutes, and the total reaction time being 93 minutes. The catalyst used was 1 gram of tri-isoamylamine. The polymer, being readily soluble in the dichloromethane layer after acidification by acetic acid, was washed twice with distilled water, and the aqueous layer separated and discarded. The polymer was precipitated in 3 gallons of methanol, filtered, and vacuum dried to give 60.0 grams of bright yellow fibers having an inherent viscosity of 0.30 in chloroform and a glass factor of 1400 (coated from cyclohexanone).

Example 18

A solution of 20 grams (0.057 mole) of divanillal cyclopentanone and 10 grams (0.044 mole) of bisphenol A in 300 ml. of water containing 50 ml. of 40 percent NaOH was reacted with 24.3 grams (0.130 mole) of ethylene bischloroformate in a two-phase system (water: methylene chloride) catalyzed by one gram of tri-n-butylamine. The resulting 37.5 grams of orange-yellow fibers had a viscosity of 0.38 and a glass factor when coated from tetrachloroethane of 800. The solubility of this polymer was about the same as the polyesters made from glutaryl chloride described above.

Example 19

A solution of 20 grams (0.057 mole) of divanillal cyclopentanone and 10 grams (0.044 mole) of bisphenol A in 400 ml. of distilled water containing 50 ml. of 40 percent NaOH was reacted in a two-phase system (water: methylene chloride) with 30 grams (0.130 mole) of neopentyl bischloroformate catalyzed by one-half gram of tri-isoamylamine. The resulting 50.5 grams of bright yellow fibers were soluble in most chlorinated solvents including trichloroethylene, chloroform, and methylene chloride and also in other organic solvents suitable for graphic arts use such as cyclohexane, dioxane, methyl ethyl ketone, methyl benzoate, methyl salicylate, anisole, acetophenone, pyridine, etc. This had a viscosity of 0.67 in chloroform and a glass factor of 1400 when coated from cyclohexanone.

Example 20

A solution of 18.6 grams (0.057 mole) of divanillal acetone and 10 grams (0.044 mole) of bisphenol A in 400 ml. of distilled water containing 50 grams of 40 percent NaOH was reacted with 30 grams (0.130 mole) of neopentyl bischloroformate in a two-phase system (water:methylene chloride) catalyzed by one-half gram of tri-isoamylamine. The resulting 44.5 grams of orange-yellow fibers had a viscosity of 0.40 in chloroform and a glass factor of 280 when coated from cyclohexanone. This polymer had the same excellent solubility as the product of Example 19.

Example 21

A solution of 20 grams (0.057 mole) of divanillal cyclopentanone and 16.1 grams (0.044 mole) of tetrachlorobisphenol A in 400 ml. of distilled water containing 50 grams of 40 percent NaOH was reacted in a two-phase system (water:methylene chloride) with 30 grams (0.130 mole) of neopentyl bischloroformate catalyzed by one-half gram of tri-isoamylamine. The resulting 57.5 grams of yellow fibers had a viscosity of 0.51 in chloroform and a glass factor of 2000 when coated from cyclohexanone. The polymer had the same excellent solubility as that described in Example 19.

Example 22

A solution of 9.9 grams (0.028 mole) of disyringal cyclopentanone, 11.6 grams (0.028 mole) of divanillal cyclopentanone, and 10.0 grams (0.044 mole) of bisphenol A in 400 ml. of distilled water containing 50 grams of 40 percent NaOH was reacted with 30 grams (0.130 mole) of neopentyl bischloroformate in a two-phase system (water:methylene chloride) catalyzed by one-half gram of tri-isoamylamine. This reaction gave 47 grams of bright orange fibers with a viscosity of 0.57 in chloroform and a glass factor of 1100 when coated from cyclohexanone. This polymer had the same excellent solubility as that described in Example 19.

Example 23

A solution of 14.2 grams (0.040 mole) of divanillal cyclopentanone 4.8 grams (0.016 mole) of vanillalazine, and 10.0 grams (0.044 mole) of bisphenol A in 500 ml. of distilled water containing 50 grams of 40 percent NaOH was reacted with 30 grams (0.130 mole) of neopentyl bischloroformate in a two-phase system (water: methylene chloride) was catalyzed by one gram of tri-isoamylamine. The resulting 45.8 grams of light yellow fibers had a viscosity of 0.36 in tetrachloroethane and a glass factor of 220 when coated from cyclohexanone. This polymer had the same excellent solubility as that described in Example 19. It also demonstrates the use of a light-sensitive bisphenolic azine to replace part of the bisphenolic chalcone or ketone.

Example 24

In the same manner 7.1 grams (0.02 mole) of divanillal cyclopentanone, 2.4 grams (0.01 mole) of salicalazine, and 4.5 grams (0.02 mole) of bisphenol A were reacted with 15.0 grams (0.065 mole) of neopentyl bischloroformate to give 22.0 grams (100 percent) of a yellow fibrous polymer with an inherent viscosity of 0.38 in chloroform and a glass factor of 280 when coated from cyclohexanone.

*Analysis.*—Calc. for $C_{24.2}H_{24.8}O_{7.2}N_{0.4}$: N, 1.3. Found: N, 1.7.

Example 25

In the same manner 7.1 grams (0.02 mole) of divanillal cyclopentanone, 4.5 grams (0.02 mole) of bisphenol A, and 2.59 grams (0.01 mole) of 4-(m-nitrophenylazo-resorcinol were reacted with 15.0 grams (0.065 mole) of neopentyl bischloroformate to give 21.6 grams (98 percent) of orange fibers with an inherent viscosity of 0.35 in chloroform and a glass factor of 55 when coated from cyclohexanone.

Example 26

In the same manner 24.7 grams (0.07 mole) of divanillal cyclopentanone and 16.3 grams (0.03 mole) of tetrabromobisphenol A were reacted with 30.0 grams (0.13 mole) of neopentyl bischloroformate to give 62.7 grams (100 percent) of greenish-yellow fibers with a viscosity of 0.22 in chloroform and a glass factor of 220 when coaated from cyclohexanone.

Example 27

In the same manner 12.3 grams (0.035 mole) of divanillal cyclopentanone, 6.8 grams (0.03 mole) of bisphenol A, and 11.1 grams (0.035 mole) of dibenzoyl-resorcinol were reacted with 30.0 grams (0.130 mole) of neopentyl bischloroformate to give 45.9 grams (100 percent) of yellow-orange fibers with an inherent viscosity of 0.39 in chloroform and a glass factor of 250 when coated from cyclohexanone.

Example 28

In the same manner 14.8 grams (0.042 mole) of divanillal cyclopentanone and 4.1 grams (0.018 mole) of bisphenol A were reacted with 18.5 grams (0.080 mole) of diethylene glycol bischloroformate to give 29 grams (100 percent) of greenish-yellow fibers with an inherent viscosity of 0.35 in chloroform and a glass factor of 1100 when coated from tetrachloroethane.

Example 29

In the same manner 6.15 grams (0.035 mole) of divanillal cyclopentanone, 3.43 grams (0.03 mole) of bisphenol A, and 7.5 grams (0.035 mole) of 2-(4-hydroxyphenylimino) - 3-(4-hydroxyphenyl)-5-(4-azidobenzen)thiazolidine were reacted with 15.0 grams (0.130 mole) of neopentyl bischloroformate to give 22.0 grams (88 percent) of a bright yellow powder with an inherent viscosity of 0.24 in chloroform and a glass factor of 180 when coated from cyclohexanone.

Example 30

In the same manner 12.7 grams (0.036 mole) of divanillal cyclopentanone and 6.0 grams (0.024 mole) of 4,4'-dihydroxydiphenyl sulfone were reacted with 20.0 grams (0.087 mole) of neopentyl bischloroformate to give 32.4 grams (100 percent) of short yellow fibers with an inherent viscosity of 0.25 in chloroform and a glass factor of 250 when coated from cyclohexanone.

*Analysis.*—Calc. for $C_{24.4}H_{24.0}O_{8.6}S_{0.4}$: S, 2.8. Found: S, 2.3.

Example 31

Fourteen and two-tenths grams of 1,3-di(o-formylphenoxy)propane was dissolved in 50 ml. of tetrahydrofurfuryl alcohol by gentle warming. To this was added 25 ml. of 1,4-dioxane and 2.9 grams of acetone. To the solution was then added 2.0 ml. of 40% sodium hydroxide solution. The solution was well shaken. It became orange in color and quite warm. After 40 minutes, the solution became cloudy, and at this point 3 ml. of glacial acetic acid was added. The product was then poured into a large volume of agitated methanol and the resulting bright yellow polymer was washed several times with methanol and dried. The yield was nearly that required by theory. The polymer was further purified by solution in dioxane and precipitation in methanol.

A 2% solution of this polymer in dioxane was coated on a rosin sized paper overcoated with a layer of partially formaldehyde tanned casein containing zinc acetate by whirling the solution onto the surface at 78 r.p.m. The coating was exposed under a line negative to a 275 watt sunlamp for five minutes at 8″. The coating was developed for one minute in dioxane and the surface was inked in accordance with the directions recommended for that surface. A clean, positive image was obtained corresponding to that on the negative.

Example 32

The procedure in Example 31 was repeated substituting 4.9 grams of cyclohexanone for the acetone. The condensation was allowed to proceed for one hour before the addition of the acetic acid. Again a bright yellow product was obtained, soluble in dioxane.

Example 33

A solution was made by warming together 14.2 grams of 1,3-di-(o-formylphenoxy)propane, 8.1 grams of p-di-acetylbenzene, and 50 ml. of 1,4-dioxane. To the solution was added 1.0 ml. of a 40% solution of trimethyl benzyl ammonium hydroxide. The solution rapidly turned dark orange in color. After two hours' standing, the slightly viscous solution was treated with a little glacial acetic acid to neutralize the alkaline catalyst. This was then poured into a large volume of agitated methanol. The product was redissolved in dioxane and poured into a large volume of water. The yellow precipitate was filtered off, washed well with water and dried in the dark. The polymer was readily soluble in dioxane and butanone-2.

Example 34

To a solution of 2.64 grams of terephthalaldehyde and 1.16 grams acetone in 35 ml. of tetrahydrofuryl alcohol was added 0.5 ml. of 50% potassium hydroxide solution. The solution became brown-red in color. After standing 24 hours in the dark, the alkaline catalyst was neutralized with acetic acid, and the solution poured into a large volume of water. The yellow product was filtered off, washed with water and dried.

The relative speed of the various light-sensitive polymers described above has been indicated by reference to a number called the "glass factor" or "Plexiglas factor" of the material. The glass factor or Plexiglas factor is the relative speed of the material tested when exposed to ultraviolet or visible light, such as that from a white flame carbon arc, under glass or plexiglass as the case may be, compared with the speed of an unsensitized coating of polyvinyl cinnamate as a standard. The speed of the standard is taken as 1.0 for both glass and Plexiglas and therefore the glass factor and Plexiglas factor of a given material are not mathematically interconvertible. A material with a glass factor of 100 is 100 times as fast or light sensitive as unsensitized polyvinyl cinnamate. The inherent viscosities of the polymers described above were determined at a concentration of 2.5 grams per liter. The term "light sensitive" as employed in the specification and claims is intended to mean that the bisphenol or polymer in question when exposed to light undergoes a change in its solubility characteristics. For example, in the case of the polymers, exposure to light causes cross linking which renders the exposed polymers insoluble in solvents for the unexposed polymer.

We claim:

1. A light-sensitive film-forming linear polyester reaction product of at least one acid dichloride selected from the group consisting of
   bischloroformates of diols, diacid chlorides of aliphatic, alicyclic and aromatic dicarboxylic acids and
diacid chlorides of phosphorus containing acids,
and at least one bisphenol, at least 5 mole percent of said bisphenol being a photosensitive bisphenol selected from the group consisting of
photosensitive dihydroxy chalcones and
photosensitive dihydroxy dibenzal ketones.

2. A polyester as defined in claim 1 wherein said photosensitive bisphenol has the formula:

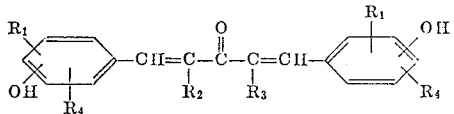

wherein $R_1$ and $R_4$ are each selected from the group consisting of hydrogen atoms and methoxy radicals, and $R_2$ and $R_3$ are each a hydrogen atom or together represent the hydrocarbon radical necessary to complete an alicyclic ring of 5 to 6 carbon atoms.

3. A polyester as defined in claim 1 which includes the reaction product of an additional bisphenol having the formula:

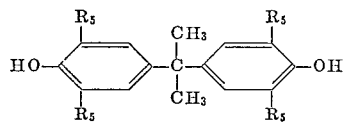

wherein $R_5$ is selected from the group consisting of hydrogen, chlorine and bromine atoms.

4. A polyester as defined in claim 1 wherein the acid dichloride is a bischloroformate having the formula:

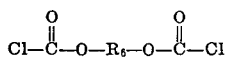

wherein $R_6$ is an alkylene radical.

5. A polyester as defined in claim 1 wherein the acid dichloride is a diacid chloride of a dicarboxylic acid and is selected from the group consisting of
fumaryl chloride,
glutaryl chloride,
azelayl chloride,
phthaloyl chloride and
1,4-cyclohexane dicarboxyl chloride.

6. A light-sensitive film-forming linear polyester reaction product as defined in claim 1 having repeating structural units derived from a bischloroformate and which have the formula:

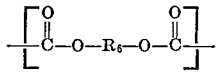

alternating with repeating structural units derived from at least one bisphenol, at least 5 mole percent of said units being selected from the group consisting of units having the formula:

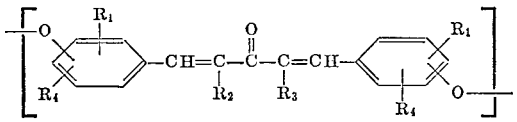

and

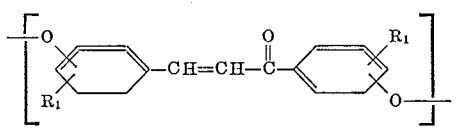

wherein $R_1$ and $R_4$ are each selected from the group consisting of hydrogen atoms and methoxy radicals, $R_2$ and $R_3$ are each a hydrogen atom or together represent the hydrocarbon radical necessary to complete an alicyclic ring of 5 to 6 carbon atoms and $R_6$ is an alkylene radical.

7. A polyester as defined in claim 6 wherein the polyester contains additional alternating units derived from a non-light-sensitive bisphenol which units have the structural formula:

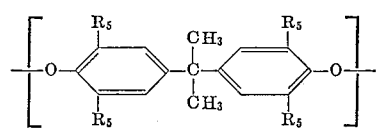

wherein $R_5$ is selected from the group consisting of hydrogen, chloride and bromine atoms.

8. A light-sensitive film-forming linear polyester reaction product of at least one bischloroformate selected from the group consisting of
ethylene bischloroformate,
diethylene bischloroformate and
neophentyl bischloroformate
and two bisphenols, at least 5 mole percent of said bisphenols being a photosensitive bisphenol selected from the group consisting of
divanillal cyclopentanone,
divanillal cyclohexanone,
divanillal 4-methylcyclohexanone and
2,6-bis(hydroxybenzal)cyclohexanone,
the remainder of said bisphenols being a bisphenol selected from the group consisting of
bisphenol A,
tetrachlorobisphenol A and
tetrabromobisphenol A.

References Cited

UNITED STATES PATENTS

| | | | |
|---|---|---|---|
| 2,728,745 | 12/1955 | Smith et al. | 260—66 |
| 2,716,097 | 8/1955 | Unruh et al. | 260—50 |
| 3,030,208 | 4/1962 | Schellenberg | 260—47 |

WILLIAM H. SHORT, *Primary Examiner.*

H. D. ANDERSON, *Assistant Examiner.*

U.S. Cl. X.R.

96—86; 117—127; 260—64, 75, 30.4, 30.6, 30.8, 32.4, 32.8, 33.8

PO-1050
(5/69)

UNITED STATES PATENT OFFICE
CERTIFICATE OF CORRECTION

Patent No. 3,453,237          Dated July 1, 1969

Inventor(s) Douglas G. Borden, Cornelius C. Unruh and Stewart H. Merrill

It is certified that error appears in the above-identified patent and that said Letters Patent are hereby corrected as shown below:

Column 6, line 42, "corbonyl" should read --carbonyl--, and the hyphen (-) preceding "styryl" should be cancelled. Column 7, line 8, "neophentyl" should read --neopentyl--; column 7, line 45 "used" should read --use--; and column 7, line 50, "2,2-bis-(4-hydroxy-3,5-dibromophenyl)propane" should read --2,2-bis(4-hydroxy-3,5-dichlorophenyl)propane--. Column 16, lines 3 to 7, the left-hand ring of the formula reading 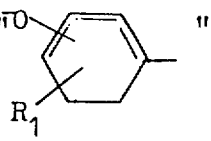 should read -- (structure) -- and the right-hand ring of the formula reading " (structure) " should read -- (structure) --;

column 16, line 29, "chloride" should read --chlorine--; and
column 16, line 35, "neophentyl" should read --neopentyl--.

SIGNED AND
SEALED
JUN 5 1971

(SEAL)
Attest:

Edward M. Fletcher, Jr.
Attesting Officer

WILLIAM E. SCHUYLER, JR.
Commissioner of Patents